United States Patent [19]
Barnes

[11] 3,715,026
[45] Feb. 6, 1973

[54] POULTRY SHACKLE
[75] Inventor: Onald R. Barnes, Oakdale, Calif.
[73] Assignee: John Mohr & Sons, Milwaukee, Wis.
[22] Filed: Sept. 21, 1970
[21] Appl. No.: 73,993

[52] U.S. Cl. .................................. 198/177, 17/44.1
[51] Int. Cl. ........................ A22c 15/00, B65g 17/20
[58] Field of Search ........ 198/177, 178, 131; 17/44.1

[56] References Cited
UNITED STATES PATENTS 3,298,500   1/1967   Jensen ............................... 198/177
3,032,172   5/1962   Jensen ............................... 198/177

Primary Examiner—Edward A. Sroka
Attorney—Townsend and Townsend

[57] ABSTRACT

A shackle having a rod for extending and supporting an eviscerated bird in a position so that moisture can drip from the bird as the shackle is moved by an overhead conveyor. The shackle has means for pivoting the rod from a generally upright position at which it supports the bird to a downwardly extending position at which the bird can gravitate from the rod. The pivoting means can operate to return the rod to its upright position.

12 Claims, 7 Drawing Figures

PATENTED FEB 6 1973
3,715,026
SHEET 1 OF 3
FIG. 1
FIG. 2
FIG. 3
FIG. 4
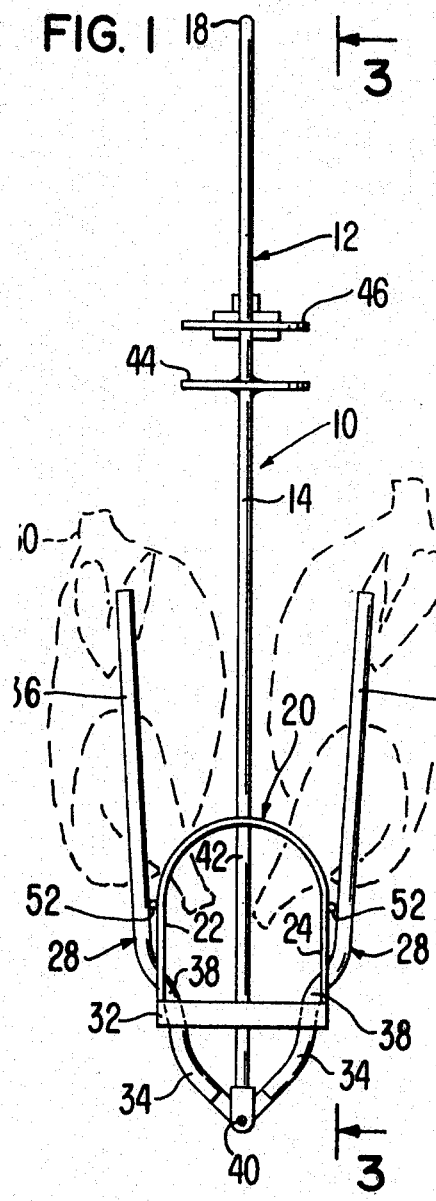
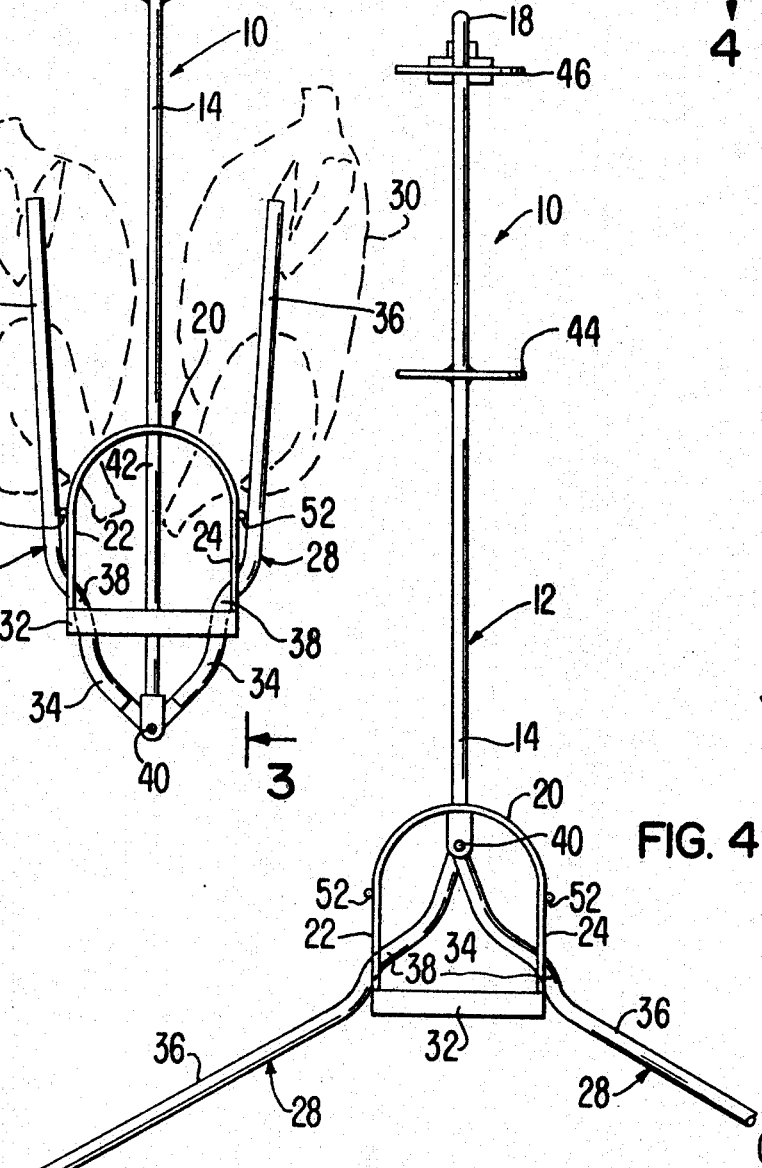
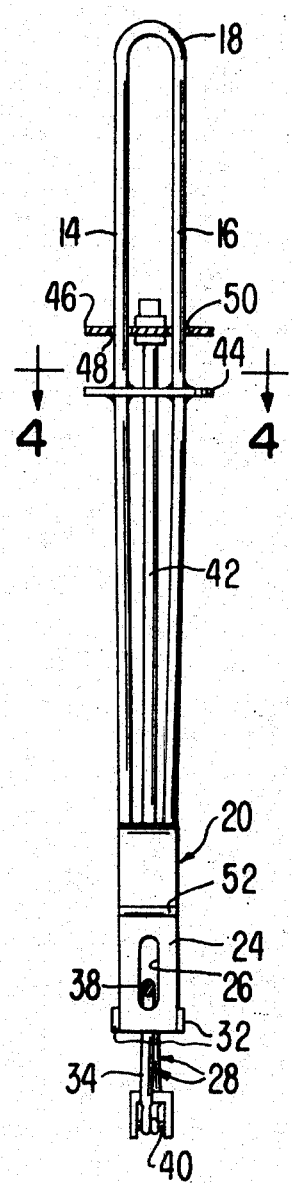
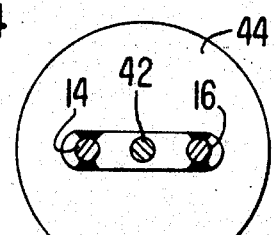
INVENTOR.
ONALD R. BARNES
BY Townsend and Townsend
ATTORNEYS

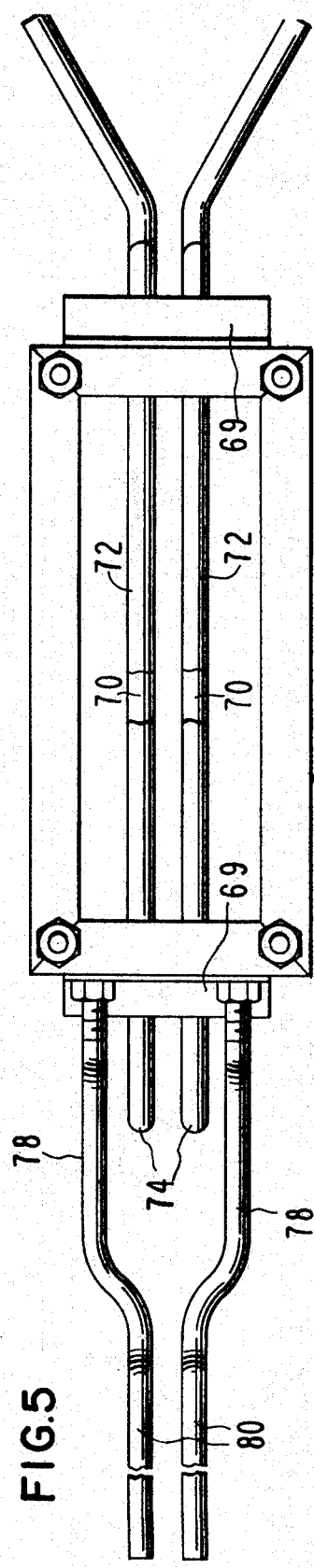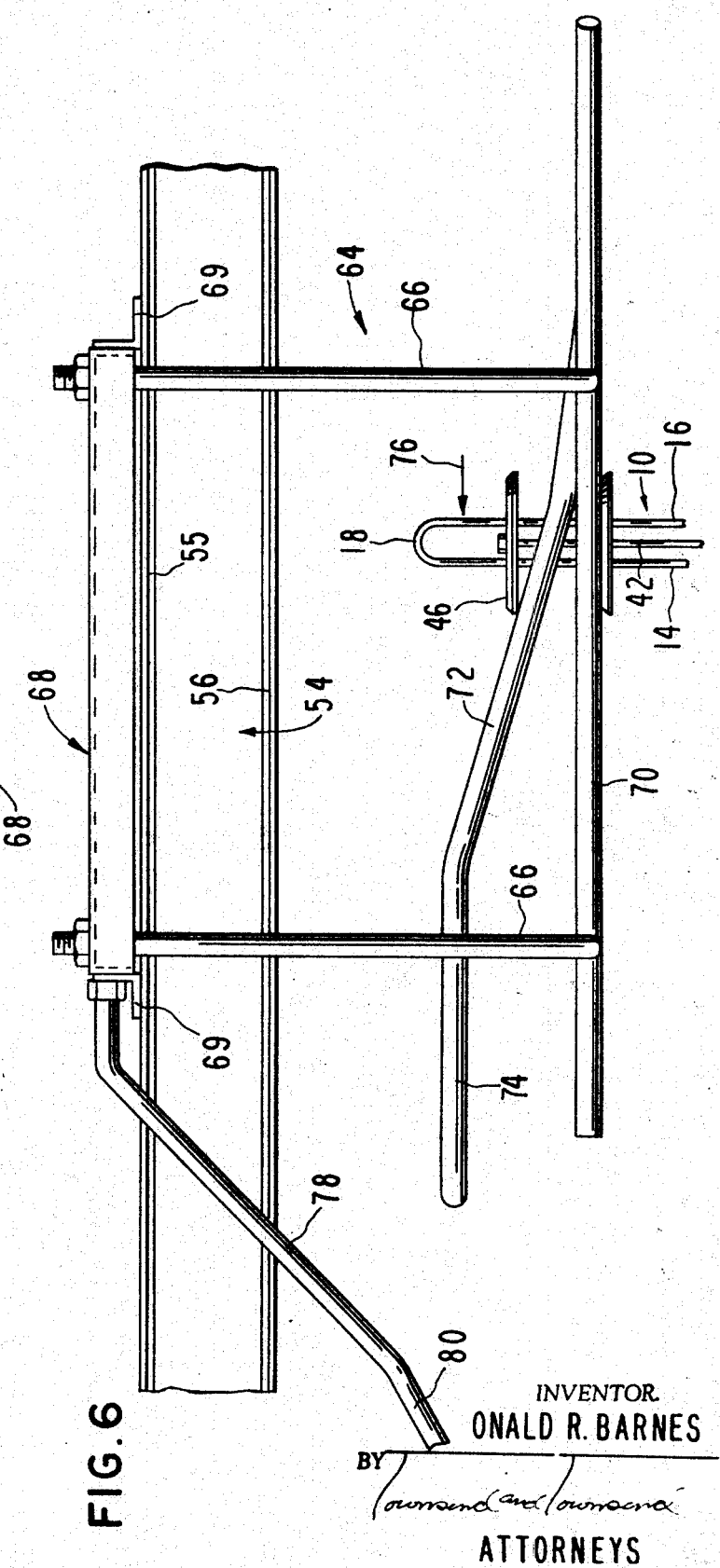

3,715,026

POULTRY SHACKLE

This invention relates to improvements in poultry shackles and, more particularly, to a shackle for supporting a bird in a position so that moisture can drip from the bird.

During the evisceration of poultry, ice water is used to chill the birds and this water must be removed before the birds are frozen; otherwise, the water will freeze and add to the weight of the birds. Thus, it is desired that the water be removed and the simplest way of doing this is to allow the water to drip from the birds.

The present invention is directed to a shackle which can support a dressed bird in a position at which water can drip from the bird as the shackle moves under the influence of an overhead conveyor. The shackle also has means for pivoting the position which supports the bird in a direction and to a location at which the bird can gravitate from the shackle, whereby it can be directed to a collection station. Means can also be provided to cause the bird supporting portion to be automatically pivoted as a function of the location of the shackle along a predetermined path. Thus, the speed of the conveyor can be adjusted to assure a minimum drip time for a bird supported by the shackle. The shackle can thereby provide a means which allows for quick removal of moisture from a dressed bird with a minimum of operator attention inasmuch as the only function of the operator is to place the bird on the shackle. The bird is automatically removed from the shackle at the proper location after the desired drip time has elapsed.

One embodiment of the shackle utilizes a hanger for attachment to an overhead conveyor with the hanger having guide means for supporting a pair of rods on which a pair of birds can be impaled when the rods are generally vertically disposed. An actuating rod is pivotally connected to the bird support rods and is movable in a direction to cause the rods to move from their upright positions to downwardly extending positions at which they allow the birds to gravitate therefrom. The guide means provides sufficient support for the rods as they move between the upright and downwardly extending positions. The actuating rod has means thereon for engaging a cam or other structure to cause movement of the actuating rod as a function of the movement of the shackle itself. Thus, the pivoting action of the bird support rods can be made automatic to thereby eliminate the need for operator attention as the birds have been placed on the support rods.

The present invention also contemplates the abovementioned shackle in combination with means adjacent to the path of the shackle for actuating the bird support rods to cause them to pivot into their downwardly extending positions as a function of the location of the shackle along the path. Such means comprises a cam which causes movement of the actuating rod in one direction to pivot the support rods downwardly, whereby the birds carried thereon can gravitate therefrom. Since the shackle is constructed so that the bird support rods can remain in either of their two positions, the actuating means includes another cam for causing movement of the actuating rod in the opposite direction as the shackle continues to move. Thus, the bird support rods are returned to their initial positions.

The primary object of this invention is to provide an improved shackle having means for supporting a bird in a position to allow moisture to drip from the bird and to allow supporting means to be moved into a position at which the bird can gravitate from the shackle so that the shackle is suitable for use in a conveyor system which extends between an evisceration station and a bird collection station at which the birds can, for instance, be placed in plastic bags prior to being frozen for marketing.

Another object of this invention is to provide a shackle of the type described wherein the shackle has a bird support pivotly mounted on a hanger adapted to be secured to an overhead conveyor with the bird support being movable from a generally upright position at which it can support a bird to a downwardly extending position at which it can release the bird by gravitation so as to render the shackle automatic in operation by virtue of the actuator by causing the pivoted movement of the bird support.

A further object of this invention is to provide a shackle in combination with cam structure and an overhead conveyor with the shackle being automatically actuated by engagement with the cam structure as the shackle is moved by the conveyor to cause gravitation of the birds from the shackle as a function of the position of the shackle along its path of travel to thereby eliminate the need for operator attention once the birds have been placed on the shackle.

Other objects of this invention will become apparent as the following specifications reference being had to the accompanying drawings for an illustration of an embodiment of the shackle.

In the drawings:

FIG. 1 is a front elevational view of the shackle when the bird support rods thereof are in upright positions;

FIG. 2 is a view similar to FIG. 1, but illustrating downwardly extending positions of the support rods.

FIG. 3 is a side elevational view of the shackle when the rods are in the upright positions;

FIG. 4 is a cross-sectional view taken along line 4—4 of FIG. 3;

FIG. 5 is a top plan view of a cam structure for actuating the shackle to cause movement of the bird support rods as they move under the influence of a conveyor system;

FIG. 6 is a side elevational view of the structure of FIG. 5; and

Figure 7:
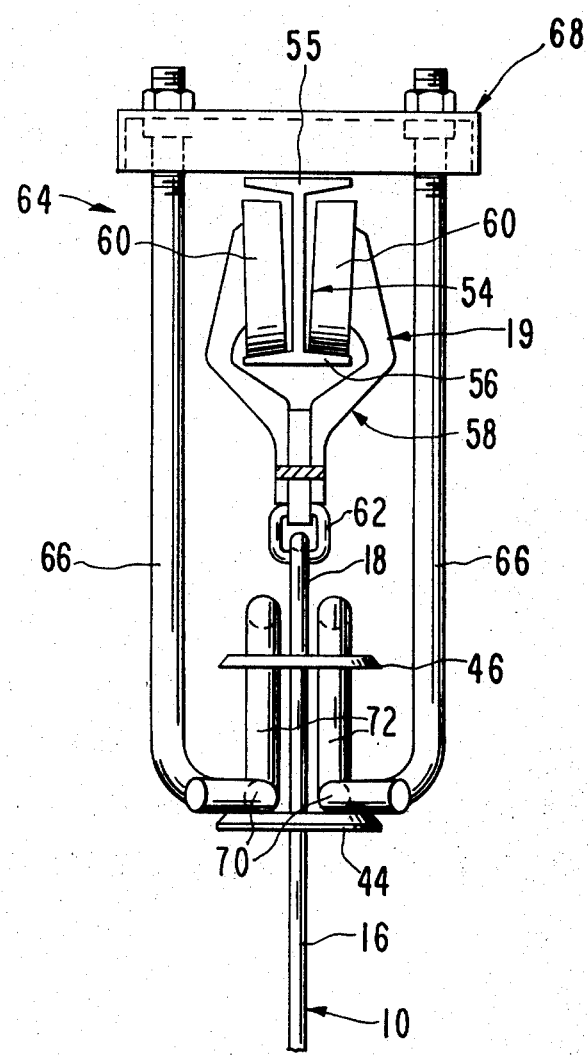
FIG. 7 is an end elevational view of the cam structure.

The shackle of this invention is denoted by the numeral 10 and includes a hanger member 12 comprised of a pair of spaced rods 14 and 16 which are interconnected at their upper ends by a curved segment 18, the latter defining means for connecting the hanger member to an overhead conveyor 19 (FIG. 7) so that the shackle can be suspended from the conveyor and moved thereby in a predetermined direction and along a preselected path of travel.

An inverted U-shaped, rigid strap 20 is secured to the lower ends of rods 14 and 16 and extends downwardly therefrom. Strap 20 has a pair of sides 22 and 24 which are generally parallel with each other and are equally spaced from the plan in which rods 14 and 16 are disposed. Each of the sides 22 and 24 has a slot 26 therein through which a pair of bird support rods 28 extends. The purpose of sides 22 and 24 is to support rods 28 when the latter are in generally upright positions as shown in FIG. 1 and when they are in generally downwardly extending inclined positions as shown in FIG. 2. In the upright positions rods 28 can support a pair of dressed birds 30 shown in dashed lines in FIG. 1 with the birds being impaled on the support rods. When the birds are in the positions shown in FIG. 1, the moisture in the birds can drip therefrom. When the bird support rods are moved into the positions shown in FIG. 2, the birds can gravitate from the rods. A pair of rigid bars 32 interconnect with ends of sides 22 and 24 to maintain the same substantially parallel with each other.

Each of the bird support rods 28 has a first, generally straight segment 34, second generally straight segment 36 and third curved segment 38 interconnecting segments 34 and 36. Segment 38 extends through the corresponding slot 26 and normally engages strap 20 at the lower end of the slot. In this way, each bird support rod 28 is supported at all times and even during the time when it is moving between the upright position of FIG. 1 and the downwardly extending position of FIG. 2.

The lower end of each segment 34 is pivotly secured by a pin 40 to the lower end of a central, actuating rod 42 which extends upwardly into the space between rods 14 and 16 (FIG. 3). A hole is provided in strap 20 to receive central rod 42, the hole being sufficiently large to allow the central rod to move up and down relative to the strap. A disk 44 is rigidly secured to rods 14 and 16 and has a central hole for shiftably receiving central rod 42. Disc 44 also serves to strengthen hanger member 12.

A second disc 46 is secured to the upper end of central rod 42. Disk 46 has a pair of holes 48 and 50 for shiftably receiving rods 14 and 16, respectively. Disc 46 is adapted to engage a tripping device, such as a cam, for causing automatic elevation of central rod 42 as a function of the movement of the shackle along its path of travel. In the lower position of central rod 42, segments 36 of bird support rods 28 bear against bearing elements 52 secured to respective sides 22 and 24. This, therefore, limits the downward movement of central rod 42 yet allows segments 28 to be supported at the low ends in respective slots 26.

Conveyor 19 is conventional in construction in that it includes an overhead I-beam 54 having an upper flange 55 and a lower flange 56 as shown in FIG. 7. A yoke 58 has a pair of rollers 60 with the rollers being supported on lower flange 56 for movement along the same. The lower end of the yoke has means, such as a ring 62 which can be coupled to segment 18 in any suitable manner. Thus, hanger member 12 will depend from yoke 58 and move therewith. Generally, beam 54 will be horizontal but it can be inclined as well to cause the shackle to follow a predetermined path. Also, the conveyor may have a number of yokes 58 for attachment to a number of shackles 10.

A tripping device suitable for use with shackle 10 is broadly denoted by the numeral 64 and is illustrated in FIGS. 5-7. Device 64 includes two pairs of rods 66 which depend from a rectangular frame 68 secured to upper flange 55 of beam 54 in any suitable manner, such as by securing a pair of rigid, L-shaped bars 69 to flange 55. Rods 66 are disposed on respective sides of beam 54 as shown in FIG. 7 and are secured at their lower ends to a pair of generally parallel, horizontal rods 70. A pair of inclined rods 72 are secured to rods 70 and extend upwardly therefrom and in the downstream direction with reference to the direction of movement of the shackle. Rods 72 are in the same vertical plane as respective rods 70 and merge into generally horizontal rod segments 74, as shown in FIG. 6. Rods 72 operate to provide a camming action for moving disk 46 upwardly to thereby cause central rod 42 to be elevated as the shackle moves in the direction of arrow 76 (FIG. 6). Rods 70 operate to engage the upper surface of disk 44 to hold the shackle itself from elevating as disk 46 is elevated. When disk 46 reaches segment 74, it will have been elevated a distance sufficient to cause bird support rods 28 to be in the downwardly extending positions of FIG. 2.

To return the bird support rods to their upwardly extending positions, additional tripping means is provided for device 64 including a pair of inclined rods 78 which are secured to frame 68 and depend downwardly therefrom and in the downstream direction with reference to the forward movement of the shackle. Rods 78 are on opposite sides of beam 54, the latter being omitted from FIG. 5 for purposes of clarity. Rods 78 converge toward each other to form a pair of generally parallel segments 80 which are also inclined and are generally in the same vertical planes as respective segments 74. Segments 80 are, therefore, operable to engage the upper surface of disk 46 to cause the latter to move downwardly as the shackle continues to move forwardly. The length of the segments 80 is such as to assure the return disk 46 to its initial lowered position shown in FIGS. 1 and 3, whereupon bird support rods 28 are caused to be raised from their bird-release positions of FIG. 2 to their bird-supporting positions of FIG. 1.

In use, shackle 10 is coupled with conveyor 19 with the plane of rods 14 and 16 being in the plane of movement of the shackle as shown in FIG. 7. Thus, bird support rods 28 will be in a plane which is substantially perpendicular to the plane of movement of the shackle.

Initially, rods 28 will be in their upright positions as shown in FIG. 1. A pair of eviscerated birds 30 are then placed on the support rods and are supported thereby as shown in the dashed lines of FIG. 1. The weights of the birds will not be great enough to cause rods 28 to be shifted outwardly and downwardly into the positions shown in FIG. 2 because the rods must pivot about pin 40. However, sides 22 and 24 of strap 20 hold rods against movement unless rod 42 is elevated. Segments 36 of rods 28 are almost vertical so that there is a very small moment arm from the pivot point of each bird support rod 28 to the line of action of the weight of the bird on the rod. Thus, the central rod is maintained or stabilized in its lowered position, and bird support rods 28 remain upright with the birds thereon even for relatively heavy birds.

As the shackle moves under the influence of the conveyor, moisture can drip from the birds. The speed of the shackle will be controlled to provide a predetermined dripping time. The shackle will eventually approach tripping device 64 and enter the space between rods 70. The entrance ends of rods 70 are flared outwardly so that the shackle is moved into the proper orientation before disk 46 is elevated. In such orientation, rods 14 and 16 will be in a vertical plane disposed between rods 70.

Continued movement of the shackle will cause the inclined rods 72 to engage disk 46. Rods 72 will then act as a cam to elevate disk 46 and thereby rod 42 to cause pin 42 to be elevated. This, in turn, causes a slight elevation of rods 28 until the rods are free to pivot about sides 22 and 24 downwardly with segments 38 as the fulcrums of such pivotal movement. Thus, continued upward movement of rods 42 will cause rods 28 to move through an arc until rods 28 are in their downwardly extending positions shown in FIG. 2. The pivotal movement of rods 28 will eventually become such that the birds thereon can slide off the rods and into bins or other collection devices below the path of travel of the shackle. Continued movement of the shackle will cause disk 46 to engage segments 80 so that the disk will be forced downwardly to cause rods 28 to be raised to their initial positions of FIG. 1.

What is claimed is:

1. A poultry shackle comprising: an elongated hanger member adapted to be suspended from an overhead conveyor; a first rod mounted on the hanger member for up and down movement relative thereto; a second rod pivotly connected to the lower end of the first rod and extending outwardly therefrom; and guide means carried by the hanger member for supporting the second rod, said means being disposed to permit the second rod to move from a first, generally upright, bird-supporting position to a second, downwardly extending, bird-releasing position where said first rod is moved in one direction relative to said hanger member.

2. A shackle as set forth in claim 1, wherein said guide means include an elongated element having a slot therethrough, the second rod extending through the slot and engageable with the element at one end of the slot, whereby the second rod can be supported by the element.

3. A shackle as set forth in claim 1, wherein said second rod includes a pair of spaced, generally straight, segments and an arcuate segment interconnecting said straight segments, said arcuate segment being disposed to engage said guide means as said second rod moves from said first position to said second position.

4. A shackle as set forth in claim 1, wherein said first rod has means at its upper end for engaging a cam, said second rod being movable from said first position to said second position when said first rod is elevated.

5. A poultry shackle comprising: an elongated hanger member having means at one end thereof for attaching the same to an overhead conveyor; a pair of spaced guides secured to and extending downwardly from the lower end of the hanger member, each guide having a slot therethrough; a first rod extending longitudinally of said hanger member and being shiftable relative thereto, said first rod disposed between said guides; a pair of second rods, each second rod being pivotally mounted at one end thereof to the lower end of the first rod and extending through the slot of a respective guide, each second rod extending upwardly when the first rod is in a lowered position and extending downwardly when the first rod is in a raised position, whereby a bird carried on a second rod will be caused to gravitate therefrom when the first rod moves from the lowered position to the raised position.

6. A shackle as set forth in claim 5, wherein said first rod has means at its upper end for engaging a cam surface to cause elevation of the rod as a function of the movement of the hanger member by an overhead conveyor.

7. A shackle as set forth in claim 5, wherein each second rod has a pair of spaced, generally straight segments and an arcuate segment interconnecting the straight segments, the arcuate segment being engageable with the adjacent guide and extending through the respective slot.

8. A shackle as set forth in claim 5, wherein said hanger member includes a pair of spaced third rods, said first rod being disposed between said third rods and movable longitudinally thereof.

9. A shackle as set forth in claim 5, wherein the guides are disposed at equally spaced locations on opposite sides of the first rod, the lower end of the first rod being below said slots when the second rods extend upwardly.

10. Poultry handling apparatus comprising: a conveyor; a shackle having means for attachment to the conveyor for movement therewith, said shackle having a bird support shiftably mounted thereon for movement from a first, bird-supporting position to a second, bird-releasing position and a vertically shiftable rod for moving the support from said first position to said second position; and a cam extending along the path of travel of the shackle and disposed for elevating said rod, whereby a bird on said support will be released therefrom.

11. Poultry handling apparatus comprising: a conveyor; a shackle having means for attachment to the conveyor for movement therewith, said shackle having a bird support shiftably mounted thereon for movement from a first, bird-supporting position to a second, bird-releasing position and a vertical rod having a bearing element at its upper end, said rod being movable up and down, said support including a second rod pivotally secured at one end thereof to the lower end of the first rod, said second rod being generally upright when it is in the first position and being inclined downwardly when it is in the second position, and means coupled with the second rod for supporting the same intermediate its ends when the latter is in either of said positions and providing a fulcrum therefor to allow the second rod to pivot from one position to the other position; a first cam adjacent to the path of travel of the shackle and engageable with the bearing element as the shackle moves in one direction to cause the first rod to be elevated to thereby cause the second rod to pivot from said first position to said second position; and a second cam engageable with the bearing element when the first rod is elevated to cause the latter to be moved downwardly and thereby cause the second rod to be returned to its first position, whereby a brid on said support will be released therefrom.

12. Apparatus as set forth in claim 11, wherein each of said cams comprises a pair of spaced, inclined rods.

* * * * *